United States Patent [19]

Haraikawa

[11] 4,148,380
[45] Apr. 10, 1979

[54] AUTOMATIC SHOE CLEARANCE ADJUSTING DEVICE IN SHOE DRUM BRAKE

[75] Inventor: Tetsuo Haraikawa, Funabashi, Japan

[73] Assignee: Tokico Ltd., Kawasaki, Japan

[21] Appl. No.: 860,321

[22] Filed: Dec. 14, 1977

[30] Foreign Application Priority Data

Dec. 20, 1976 [JP] Japan .................................. 51-153053

[51] Int. Cl.$^2$ ............................................. F16D 65/56
[52] U.S. Cl. ............................ 188/79.5 B; 192/111 A
[58] Field of Search .......... 188/196 B, 79.5 B, 79.5 S, 188/79.5 GE; 192/111 A

[56] References Cited

U.S. PATENT DOCUMENTS

| | | | |
|---|---|---|---|
| 2,264,454 | 12/1941 | Para | 188/79.5 B |
| 2,570,398 | 10/1951 | Smith | 188/79.5 B |
| 4,061,211 | 12/1977 | Hoshino et al. | 188/79.5 P |

FOREIGN PATENT DOCUMENTS

| | | | |
|---|---|---|---|
| 766811 | 4/1934 | France | 188/79.5 B |
| 1191320 | 5/1970 | United Kingdom | 188/79.5 P |

Primary Examiner—George E. A. Halvosa
Attorney, Agent, or Firm—Wenderoth, Lind & Ponack

[57] ABSTRACT

An automatic shoe clearance adjusting device in a shoe drum brake of the type including a first strut member, a second strut member telescopically projecting from the first strut member, an adjusting nut rotatably mounted on the first strut member and engaging in screw threaded engagement with the second strut member, a member for rotating the adjusting nut in one direction, and a structure for controlling the rotation of the adjusting nut in the opposite direction. The rotation control structure is associated with a heat responsive element such that when the temperature in the brake exceeds a predetermined level, the adjustment of shoe clearance will not be effected.

1 Claim, 5 Drawing Figures

AUTOMATIC SHOE CLEARANCE ADJUSTING DEVICE IN SHOE DRUM BRAKE

BACKGROUND OF THE INVENTION

This invention relates to an automatic shoe clearance adjusting device in a shoe drum brake for use in vehicles such as automobiles and, particularly, to an automatic shoe clearance adjusting device of the type including a first strut member, having a hollow or cylindrical portion on one end, a second strut member having a male screw threaded portion thereon and engaging telescopically with the first strut member with one portion thereof being received in the cylindrical portion of the first strut member, an adjusting nut supported rotatably on the first strut member and engaging with the screw threaded portion of the second strut member, and means for rotating the adjusting nut on the second strut member when clearance (shoe clearance) between the brake shoes and the brake drum of the shoe drum brake exceeds a predetermined value.

In a conventional automatic shoe clearance adjusting device of the aforesaid type, the adjusting nut is rotated by a suitable member such as an adjusting lever rotatable by a hand brake lever when applying the hand brake, and the reverse rotation of the adjusting nut by the adjust lever is prevented by frictional force acting between the first strut member and the adjusting nut caused by the shoe returning force. Shoe return springs disposed between the shoes usually provide the shoe returning force, but the force will sometimes be reduced by frictional force in the hydraulic cylinder or frictional force between the shoes and the back plate whereby adjustment of the clearance is not effected properly.

To prevent such reverse rotation of the adjusting nut there has been proposed a pawl member engaging with the adjusting nut, but there is a shortcoming in this arrangement in that when the brake is applied under a severe condition the adjusting nut rotates too much in applying the brake due to thermal expansion of the brake drum, thus causing over-adjustment.

BRIEF SUMMARY OF THE INVENTION

An object of the present invention is to prevent the aforesaid shortcoming. There is provided an automatic shoe clearance adjusting device of the type, according to the present invention, comprising a rotation resisting member mounted on the first strut member with one end thereof engaging normally with the adjusting nut to resist the rotation of the adjusting nut, and a heat responsive element acting on the rotation resisting member to release the engagement between the adjusting and the rotation resisting member when the temperature in the brake exceeds a predetermined level.

BRIEF DESCRIPTION OF THE DRAWINGS

Other objects and advantages of the present invention will be apparent from the following description with reference to the drawings, wherein.

DETAILED DESCRIPTION OF THE EMBODIMENT

Figure 1:
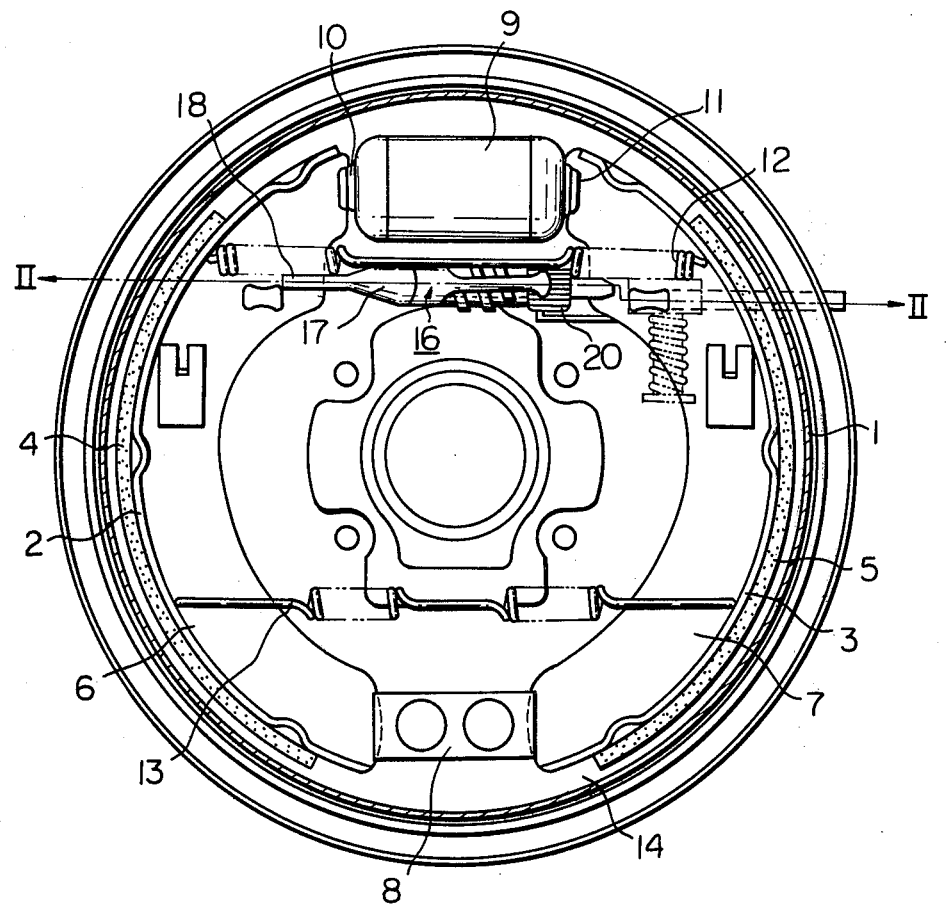
FIG. 1 is an elevational view of a shoe drum brake according to the present invention.
Figure 2:
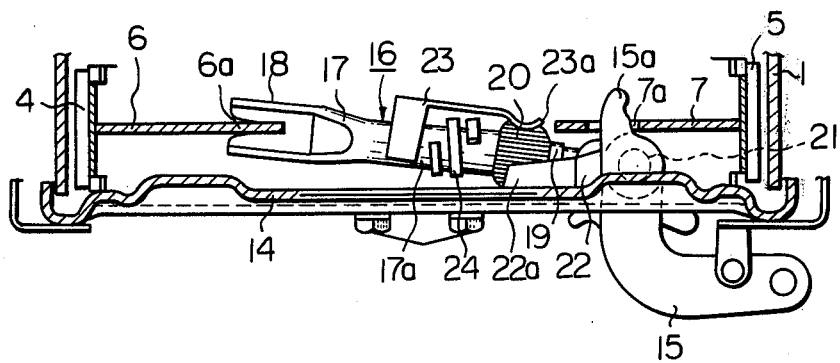
FIG. 2 is a cross-sectional view taken generally along line II—II in FIG. 1.
Figure 3:
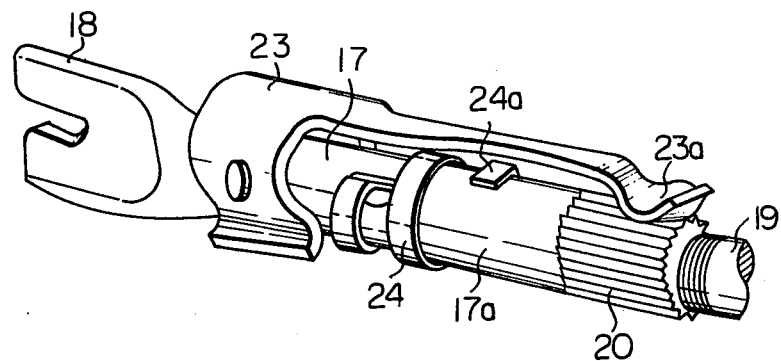
FIG. 3 is a perspective view showing the relation between the first strut member and the pawl member in the first embodiment.

Referring to FIGS. 1 and 2, a description will firstly given with reference to the general arrangement of a shoe drum brake. A brake drum 1 rotates integrally with a wheel (not shown). Inside of the drum 1, there are disposed shoes 6 and 7 having respective rims 2 and 3 with linings 4 and 5 attached thereon. One end of each of the shoes 6 and 7 is supported on an anchor 8, and the other end abuts a corresponding one of pistons 10 and 11 of a wheel cylinder 9. Two return springs 12 and 13 extend between the shoes 6 and 7 to urge them toward each other. Shown at 14 is a back plate, and at 15 ia a hand brake lever.

One end 15a of the hand brake lever 15 extends through and engages in an opening 7a formed in the shoe 7. The lever 15 has a supporting shaft 21 thereon, and one end of a strut member 19 is rotatably supported on the shaft 21.

An end portion 6a of the shoe 6 engages in a fork shaped portion 18 of a strut member 17. The strut member 17 and the strut member 19 constitute a strut 16 and will be referred as first and second strut member 17 and 19 respectively. One end portion of the second strut member 19 is received telescopically in a hollow or cylindrical portion 17a of the first strut member 17. The second strut member 19 has a male screw thread portion thereon on which is treaded an adjusting nut 20. The nut 20 has ratchet teeth on the outer periphery and, one end surface thereof contacts the open end surface of the first strut member 17.

An adjusting lever 22 is secured to the supporting shaft 21 of the hand brake lever 15 and rotates generally with the lever 15. A tip end 22a of the lever engages with the ratchet teeth on the adjusting nut 20. When the hand brake is applied, the lever 15 rotates clockwise in FIG. 2 around the shaft 21, and the lever 22 rotates the adjusting nut 20 on the second strut member 19 to project the second strut member 19 out of the first strut member 17 when clearance between shoe linings 3 and 4 and the drum 1 exceeds a predetermined value.

The construction and function described above are well known to those skilled in the art. In such automatic shoe clearance adjusting devices, some means for preventing reverse rotation of the adjust nut 20 during the brake releasing stroke have been provided, because the shoe returning force supplies by shoe return springs 12 and 13 will sometimes be decreased to zero by the resisting force of the wheel cylinder 9 and the resisting force between the back plate 14 and the shoes 6 and 7, and sufficient frictional force will not act between the first strut member 17 and the adjust nut 20.

According to the present invention, a pawl member 23 is mounted on the first strut member 17 to act as a rotation resisting member. A pawl portion 23a formed on the tip end of the pawl member 23 normally abuts the adjusting nut 20 to supply sufficient resisting force to the nut 20 when the adjusting lever 22 tends to rotate the nut 20 in the reverse direction (during the brake release stroke after the nut 20 has been rotated by the adjusting lever 22).

A coil-like shaped bi-metal element 24 is wound around the first strut member 17 with one end 24a being disposed adjacent to the pawl portion 23a of the pawl member 23. When the temperature of the interior of the brake rises above a predetermined level, the end 24a moves the pawl portion 23a up away from ratchet teeth of the adjusting nut 20, so that adjustment of shoe clearance is not effected, since although the nut 20 is rotated by the lever 22 during the brake applying stroke, the nut 20 is also rotated in the reverse direction by the lever 20 by the same amount during the brake releasing stroke. Usually the internal temperature of a shoe drum brake is about 100° C. or less, and the bi-metal element 24 according to the present invention may be constructed to act at about 100° C. The actuating temperature may naturally be changed according to various requirements.

In the automatic shoe clearance adjusting device having the construction described above, the pawl portion 23a normally applies a radial force on the adjusting nut 20, so that the adjusting nut has a suitable resisting force applied thereto for resisting the rotation thereof to allow the adjusting lever 22 to pass over one or more ratchet teeth of the nut during the brake release or return stroke even when sufficient frictional force is not present between the adjusting nut 20 and the first strut member 17 from the return springs 12 and 13. Thus, reverse rotation of the adjusting nut 20 can effectively be prevented.

However, when temperature of the brake exceeds a predetermined level owing to severe conditions of usage, the bi-metal element 24 acts to move the pawl portion 23a of the pawl member 23 upward, with the end 24a engaging with and moving the pawl portion 23a up. The pawl member 23 then no longer acts to prevent reverse rotation of the adjusting nut 20, and the adjusting nut 20 is returned to its initial position by adjust lever 22 during its return stroke, whereby adjustment of shoe clearance will not be effected. Therefore, under severe conditions usage in which the temperature of the brake exceeds a predetermined level, adjustment of shoe clearance will not be performed and overadjustment can effectively be prevented.

Figure 4:
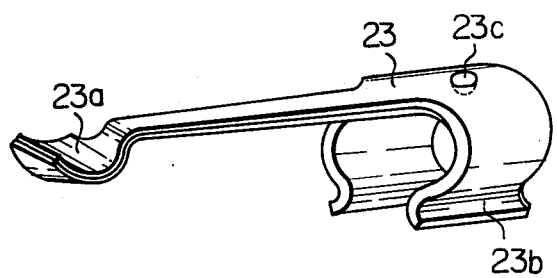
FIG. 4 is a perspective view of another embodiment of the present invention.

FIG. 4 shows another embodiment of the present invention. In the first embodiment a bi-metal element 24 acts on pawl portion 23a of the pawl member 23. In FIG. 4, a portion of pawl member 23 extending from the main body thereof to constitute the pawl portion 23a is itself a bi-metal portion, and when the temperature in the brake exceeds a predetermined level the bi-metal in the pawl member 23 deflects the tip and portion 23a upward in the drawing whereby, the adjusting nut 20 is released from the pawl member 23.

Figure 5:
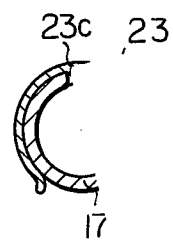
FIG. 5 is a cross-sectional view of first strut member with a pawl member mounted thereon.

In FIGS. 4 and 5, the base portion or mounting portion of the pawl member 23 has generally C-shaped clamp portion 23b and a projection 23c. A recess 17b is formed in the first strut member 17. The pawl member 23 can easily be mounted on the first strut member 17 with clamp portion 23b embracing the strut member 17 and projection 23c being located in the recess 17b.

The configuration and the construction of the pawl member as shown is not intended to limit the present invention, and the pawl member may be mounted on the first strut member 17 by any suitable means such as screws, a clamping band or the like. In the embodiment shown, shoe clearance is adjusted by actuating the hand brake lever 15, but it will be noted that the present invention may be applied to an automatic shoe clearance adjusting device of the type in which adjustment is effected when a hydraulic brake actuator (wheel cylinder) is actuated. A ratchet pawl may be formed on pawl portion 23a so as to allow rotation of the adjusting nut in the direction of adjustment (increasing the effective length of the strut) and to prevent reverse rotation normally. In the embodiments, bi-metal elements are utilized as the heat responsive element, but any suitable heat responsive elements may be utilized to release the engagement between the adjusting nut 20 and rotation resisting member 23 by the mechanical displacement caused in the member 23 in response to a temperature exceeding a predetermined level.

Therefore, in the automatic shoe clearance adjusting device according to the present invention a rotation resisting member normally engaging with adjusting nut to prevent reverse rotation of the nut is disengaged from the adjusting nut by a heat responsive element when the temperature of the whole exceeds a predetermined level and, thus it is possible to prevent overadjustment which has sometimes been effected in conventional devices when applying the brake heavily or when the brake drum is at a high temperature and, therefore, it is possible to maintain the desired shoe clearance reliably. Further, in the prior art devices the shoe clearance has been set, in consideration of the thermal deformation of the brake drum, at a relatively large value. It is possible to set a small shoe clearance according to the present invention, thus minimizing the stroke of the brake pedal.

What is claimed is:

1. An automatic shoe clearance adjusting device for a shoe drum brake, comprising: a first strut member having a cylindrical portion on one end, a second strut member having a male screw threaded portion thereon and having one end portion thereof received in the cylindrical portion of the first strut member in telescopic engagement therewith, an adjusting nut rotatably mounted on the first strut member and threaded on the screw threaded portion of the second strut member, means for rotating the adjusting nut on the second strut member in one direction when the shoe clearance exceeds a predetermined value, a rotation resisting member mounted on the first strut member and normally engaging with the adjusting nut to prevent rotation of the adjusting nut in the opposite direction, and a coil-shaped bimetallic member coiled around the first strut member and having one end connected to the first strut member and the other end being disposed adjacent said rotation resisting member for acting on the rotation resisting member to move it out of engagement with the adjusting nut when the temperature of the brake exceeds a predetermined level.

* * * * *